(12) United States Patent
Petrany et al.

(10) Patent No.: US 11,810,289 B2
(45) Date of Patent: Nov. 7, 2023

(54) ESTIMATING THE MOVING STATE OF ROTATING MACHINES SYSTEMS AND METHODS

(71) Applicant: Caterpillar Inc., Peoria, IL (US)

(72) Inventors: Peter J. Petrany, Peoria, IL (US); Jacob C. Maley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 273 days.

(21) Appl. No.: 17/219,790

(22) Filed: Mar. 31, 2021

(65) Prior Publication Data

US 2022/0318974 A1    Oct. 6, 2022

(51) Int. Cl.
*G06T 7/00* (2017.01)
*G01D 5/26* (2006.01)
*G06T 7/70* (2017.01)
*G06T 7/60* (2017.01)
*G01P 3/38* (2006.01)

(52) U.S. Cl.
CPC ............ *G06T 7/001* (2013.01); *G01D 5/26* (2013.01); *G01P 3/38* (2013.01); *G06T 7/60* (2013.01); *G06T 7/70* (2017.01); *G06T 2207/30164* (2013.01)

(58) Field of Classification Search
CPC .. G06T 7/20; G06T 7/246; G06T 7/70; G06T 7/74; G06T 7/579; G06T 7/11; G06T 7/215; G06T 7/0004; G06T 7/001; G06T 2207/30108; G06T 2207/30164; G06T 2207/30248; G06T 2207/30252; G06V 10/50; G06V 10/759; G06V 20/56; G06V 20/58; G06V 20/52; G01P 3/36; G01P 3/38; G01P 3/68; G01D 5/26

See application file for complete search history.

(56) References Cited

U.S. PATENT DOCUMENTS

| 8,358,686 B2 * | 1/2013 | Stephan | H04N 19/61 |
| | | | 375/240.16 |
| 10,318,821 B2 * | 6/2019 | Kim | B60W 30/18154 |

(Continued)

FOREIGN PATENT DOCUMENTS

| DE | 102008061060 A1 | 6/2010 |
| DE | 102013210591 A1 | 12/2014 |

(Continued)

*Primary Examiner* — Ian L Lemieux
*Assistant Examiner* — Woo C Rhim

(57) ABSTRACT

The present disclosure is directed to systems and methods for estimating machine rotation state. The rotation state can include the rotation speed and/or angle as the machine rotates. In some implementations, an estimating machine rotation state system can receive image data, timestamped consecutively, from camera devices of a machine. The estimating machine rotation state system can generate optical flow vectors for the pixels of the image data and determine the hue and intensity of the pixels based on the optical flow vectors. Using the hues, intensities, and timestamps of the image data, the estimating machine rotation state system can generate an intensity plot over time. The estimating rotation states system can then determine a rotation speed of the machine based on the intensity plot. The estimating rotation states system can also determine a rotation angle of the machine by integrating the intensity plot over time.

20 Claims, 6 Drawing Sheets

(56) References Cited

U.S. PATENT DOCUMENTS

| | | | | |
|---|---|---|---|---|
| 10,466,712 | B2* | 11/2019 | Ferguson | G05D 1/0231 |
| 2006/0285724 | A1* | 12/2006 | Tian | G06V 20/52 |
| | | | | 382/103 |
| 2009/0195774 | A1* | 8/2009 | Kawakami | G06T 7/285 |
| | | | | 356/73 |
| 2016/0191945 | A1* | 6/2016 | Gurbuz | G06T 7/246 |
| | | | | 375/240.15 |
| 2016/0307321 | A1* | 10/2016 | Moon | G06T 7/207 |
| 2018/0075609 | A1* | 3/2018 | He | G06T 7/20 |
| 2018/0129902 | A1* | 5/2018 | Li | G06T 7/246 |
| 2018/0295273 | A1* | 10/2018 | Li | G06T 7/194 |
| 2019/0318486 | A1* | 10/2019 | Gupta | G06T 7/285 |
| 2022/0215559 | A1* | 7/2022 | Yi | G06V 10/462 |

FOREIGN PATENT DOCUMENTS

| | | |
|---|---|---|
| DE | 102017011558 A1 | 5/2018 |
| EP | 3657130 A1 | 5/2020 |

* cited by examiner

ESTIMATING THE MOVING STATE OF ROTATING MACHINES SYSTEMS AND METHODS

TECHNICAL FIELD

The present disclosure is directed to a system and method for estimating the moving state of rotating machines via camera-based methods.

BACKGROUND

In many industrial applications and environments, it is necessary to determine the current state of a machine. For example, is a machine that can move and rotate currently moving forward, backward, or rotating (i.e., the "rotation state"). The information regarding the current state of the machine can be used to supplement other systems and inform operators of further actions to carry out. Conventional systems and methods typically involve using a variety of sensors on the machine to collect the information regarding the current state of the machine. For example, existing systems and methods can use rotation sensors on the machine to determine the speed and/or angle of rotation of the machine. These techniques typically require large amounts of sensory data to be collected and deep knowledge of the kinematics and dynamics of the machine.

For example, U.S. Pat. No. 8,358,686B2 to Martin (hereinafter "Martin") describes employing various sensors to reconstruct a vehicle's current state of motion and to estimate the optical flow within a camera's visual field. In particular, Martin discloses exploiting sensory information on the current state of motion of the vehicle to estimate the optical flow so that motion vectors required for video data compression can be determined more efficiently. As a result, sensor-free determination of the current state of a vehicle or machine is lacking from the systems and methods described by Martin.

There is a need for systems and methods that can determine the current state, or more specifically the rotation state, of a machine without specific sensors and a kinematics or dynamics model of the machine. As used herein "rotation state" can refer to the speed and/or angle of rotation of a machine. For example, the rotation state of an excavator can be how much or how fast the rotating platform is currently rotating. Some computer vision methods can estimate the relative motion between objects and/or surfaces but fall short of being able to estimate the rotational motion between entities. Additionally, there is a need for accurate and robust estimation of the rotation of a rotating machine using just camera and vision-based methods.

It is with respect to these and other general considerations that the aspects disclosed herein have been made. Also, although relatively specific problems may be discussed, it should be understood that the examples should not be limited to solving the specific problems identified in the background or elsewhere in the disclosure.

SUMMARY

According to a first aspect, a system can include processors and memories storying instructions that when executed by the processors, cause the system to perform a process. The process can include receiving image data records that are timestamped consecutively from a machine. For each particular image data record of the image data records, the process can also include: generating optical flow vectors for the pixels of the particular image data record, selecting a subset of pixels from the pixels of the particular image data record, and determining a hue and intensity of the subset of pixels based on the optical flow vectors for the subset of pixels. The process can also include generating an intensity plot over time based on the hues, intensities, and timestamps for the image data records. The process can further include calculating an integral of the intensity plot over time, and then determining a rotation angle of the machine based on the calculated integral.

According to a further aspect, a method can include receiving image data records that are timestamped consecutively from a machine. For each particular image data record of the image data records, the method can also include: generating optical flow vectors for the pixels of the particular image data record, selecting a subset of pixels from the pixels of the particular image data record, and determining a hue and intensity of the subset of pixels based on the optical flow vectors for the subset of pixels. The method can also include generating an intensity plot over time based on the hues, intensities, and timestamps for the image data records. The method can further include calculating an integral of the intensity plot over time, and then determining a rotation angle of the machine based on the calculated integral.

According to another aspect, a computer-readable storage medium storying non-transitory computer executable can include instructions that when executed by a computing system, cause the computing system to perform a process. The process can include receiving image data records that are timestamped consecutively from a machine. For each particular image data record of the image data records, the process can also include: generating optical flow vectors for the pixels of the particular image data record, selecting a subset of pixels from the pixels of the particular image data record, and determining a hue and intensity of the subset of pixels based on the optical flow vectors for the subset of pixels. The process can also include generating an intensity plot over time based on the hues, intensities, and timestamps for the image data records. The process can further include calculating an integral of the intensity plot over time, and then determining a rotation angle of the machine based on the calculated integral.

BRIEF DESCRIPTION OF THE DRAWINGS

Non-limiting and non-exhaustive examples are described with reference to the following figures.

The techniques introduced here may be better understood by referring to the following Detailed Description in conjunction with the accompanying drawings, in which like reference numerals indicate identical or functionally similar elements.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Figure 1:
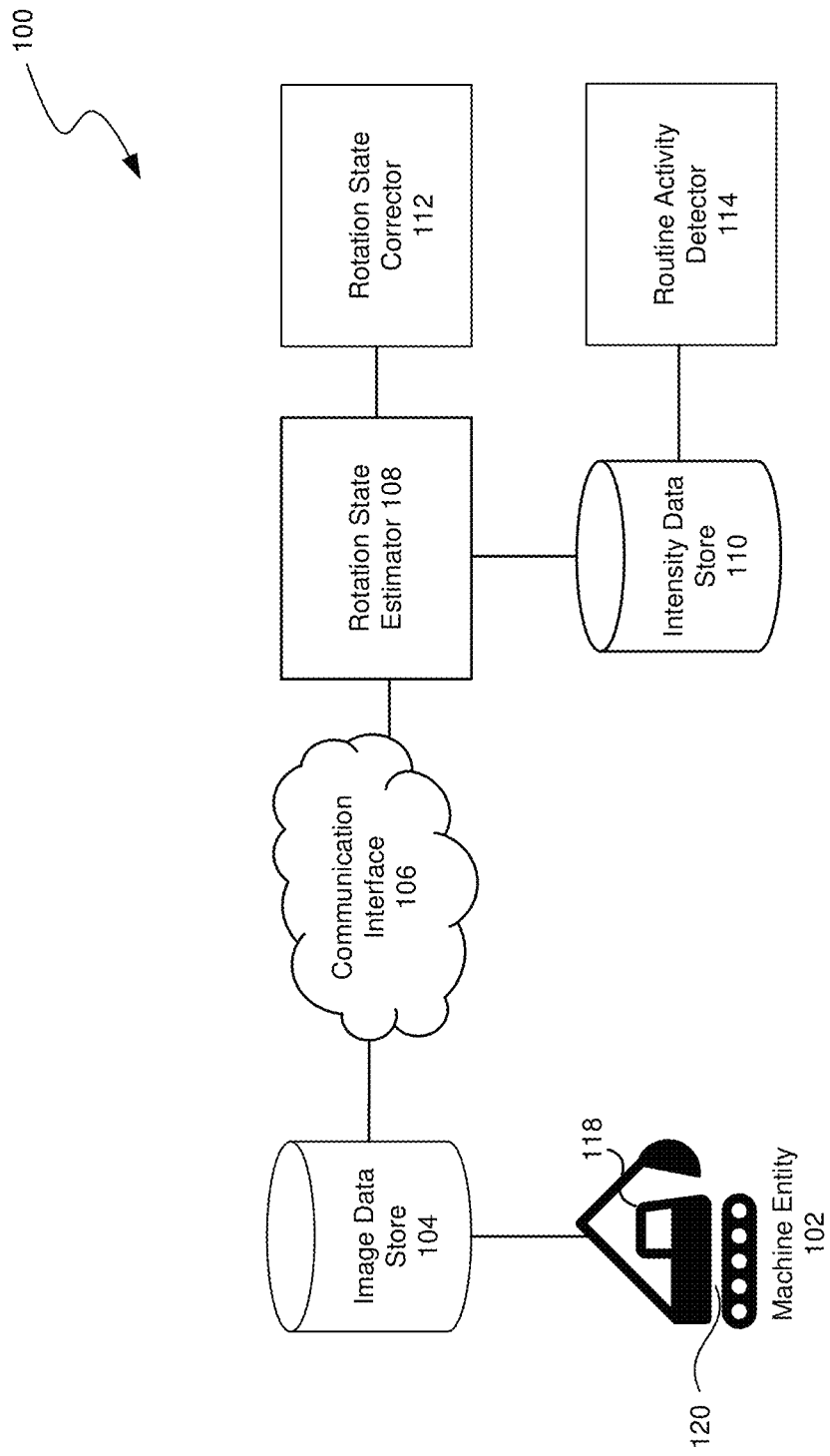
FIG. 1 is a block diagram illustrating components which, in some implementations, can be used in an estimating machine rotation state system.

FIG. 1 is a block diagram illustrating components which, in some implementations, can be used in an estimating machine rotation state system 100. Machine entity 102, of the estimating machine rotation state system 100, can be any telematics-enabled industrial machinery, vehicle, equipment, or device, which can rotate. For example, machine entity 102 can be an excavator. Machine entity 102 can also be, but is not limited to, a cement truck, bulldozer, truck, asphalt paver, backhoe loader, cold planer, compactor, dozer, dragline, drill, rope shovel, mining shovel, material handler, motor grader, pipelayer, road reclaimer, track loader, telehandler, track loader, mining truck, conveyer, utility vehicle, wheel loader, tractor, or scraper. Machine entity 102 can be engaging in a non-routine activity and/or routine activity including, but not limited to, bulldozing, shoveling, dumping, storing, mixing, transporting, lifting, constructing, landscaping, and/or any combination thereof.

Machine entity 102 can be configured to collect image data records via one or more camera devices built into, mounted onto, or attached to machine entity 102. The one or more camera devices can capture a field of view and surroundings of the industrial workspace of machine entity 102 (e.g., a dirt field, a construction site, a warehouse, a resource extraction site, an energy plant, an industrial facility). In some implementations, the one or more camera devices can be attached to a rotatable structure of machine entity 102, allowing the one or more camera devices to rotate as machine entity 102 rotates. For example, the one or more camera devices can be attached to cab 118 of the machine entity 102 that is above swing drive 120 (the component that rotates the components above the tracks, e.g., cab, arm, and bucket of the excavator). The one or more camera devices can capture changes in the scene of machine entity 102 as machine entity 102 rotates. Possible camera devices can include, but are not limited to, digital cameras, panoramic cameras, video cameras, smart cameras, wide-angle lens cameras, fisheye lens cameras, and/or any combination thereof. The image data records collected from the one or more camera devices can include, but are are not limited to, digital camera images, panoramic images, videos, video frames, smart camera images, wide-angle lens camera images, fisheye lens camera images, and/or any combination thereof.

Machine entity 102 can be configured to store the image data records in image data store 104, of the estimating machine rotation state system 100, when it collects image data records. Each image data record stored can be time-stamped consecutively according to when the image data record was collected by the one or more camera devices. In some words, the image data records can be consecutive frames of one another. The one or more camera devices of the machine entity 102 can capture image data records consecutively at a predefined rate or framerate as machine entity 102 is engaged in industrial worksite activity. In other words, the image data records can each have timestamps that are a predefined amount of time apart from one another and/or are collected consecutively within a predefined time range (e.g., images or video frames captured consecutively at 1 ms, 2 ms, 3 ms, and 4 ms, within a time range of 0ms to 4 ms). Machine entity 102 can, in response, store the image data records after they are captured in image data store 104.

Communication interface 106, of the estimating machine rotation state system 100, can be configured to obtain and/or receive image data records from image data store 104. Communication interface 106 can receive the image data records wirelessly, wired, over a cloud, or over any communication network. Furthermore, communication interface 106 can be configured to receive the image data records in parallel or sequentially. In some implementations, communication interface 106 can be configured to receive new image data records stored in image data store 104 and filter previously already received image data records. In response to obtaining and/or receiving image data records, communication interface 106 can send the image data records to rotation state estimator 108.

Rotation state estimator 108, of the estimating machine rotation state system 100, can be configured to receive the image data records from communication interface 106. In some implementations, rotation state estimator 108 can receive a batch or set of image data records timestamped consecutively within a time range as machine entity 102 is engaged in some industrial activity. The set of image data records can be consecutive frames capturing visual changes in the environment of machine entity 102 as it moves and/or rotates (e.g., objects in the scene shift left or right with respect to the one or more camera devices as machine entity 102 rotates clockwise or counterclockwise respectively). For each particular image data record of the set of image data records, rotation state estimator 108 can generate optical flow vectors for a set of pixels in the particular image data record. Rotation state estimator 108 can select a subset of pixels from the set of pixels and determine a hue and intensity of the subset of pixels. The subset of pixels can be a group of pixels that have image coordinates with close proximity to one another in a predefined region of the particular image data record. Rotation state estimator 108 can determine the hue and intensity of the subset of pixels based on the optical flow vectors generated for the subset of pixels.

In some implementations, the hue of the pixels can represent the motion of the environment with respect to the lens of the camera device that captured the particular image data record. An optical flow vector pointing generally in the rightwards direction can map to a red hue, while an optical flow vector pointing generally in the leftwards direction can map to a cyan hue. Rotation state estimator 108 can determine a red hue for the subset of pixels when the majority of the corresponding optical flow vectors for the subset of pixels point to the right. Rotation state estimator 108 can determine a cyan hue for the subset of pixels when the majority of the corresponding optical flow vectors for the subset of pixels point to the left. A red hue for the pixels of the particular image data record can thus indicate that the objects and/or environment of the scene are moving left-to-right with respect to machine entity 102. Accordingly, red hues indicate machine entity 102 is currently rotating counterclockwise, at the timestamp of the particular image data record, with respect to the objects and/or environment. A cyan hue for the pixels of the particular image data record can thus indicate that the objects and/or environment of the scene are moving right-to-left with respect to machine entity 102. Accordingly, cyan hues indicate machine entity 102 is currently rotating clockwise, at the timestamp of the particular image data record, with respect to the objects and/or environment.

In some implementations, the intensity or brightness of the pixels can represent the speed of the rotation or motion of machine entity 102. The greater the intensity of the pixels of the particular image data record is (i.e. more whites in the pixels), the greater the rotation speed of machine entity 102 at the timestamp of the particular image data record. The lesser the intensity of the pixels of the particular image data record is (i.e. more grays or blacks in the pixels), the slower the rotation speed of machine entity 102 at the timestamp of the particular image data record. For example, a particular image data record containing pixels with a red hue and higher intensity can indicate that machine entity 102 is rotating counterclockwise at a faster speed. As another example, pixels with a cyan hue and lower intensity can indicate that machine entity 102 is rotating clockwise at a slower speed.

After determining the hue and intensity for the subset of pixels of each of the image data records, rotation state estimator 108 can generate an intensity plot over time based on the hues and/or intensities. Each image data record can have a determined hue, intensity, and timestamp (e.g., {hue, intensity, timestamp}). Rotation state estimator 108 can plot the intensities of the image data records as a function of the corresponding timestamps. For example, if there are three image data records, rotation state estimator 108 can plot the intensity-timestamp pairs, where the intensities are the Y-values and the timestamps are the corresponding X-values of the plot. The intensity plot can represent the rotation speed or motion of machine entity 102 over time. Rotation state estimator 108 can then calculate an integral of the intensity plot over time. In some implementations, rotation state estimator 108 can fit a regression curve to the intensity plot over time, and then determine the area under the curve or integrate the function of the curve. The calculated integral can represent the rotation angle of machine entity 102 over time. Rotation state estimator 108 can subsequently determine the rotation angle of machine entity 102 (i.e. how much machine entity 102 has rotated over a time range or at an instance in the intensity plot) based on the calculated integral of the intensity plot over time. In some implementations, rotation state estimator 108 can store the intensity plot over time in intensity data store 110.

Rotation state corrector 112 can correct the accumulation in error of the rotation angles estimated by rotation state estimator 108. As machine entity 102 rotates more and more over time, even slight errors in the estimated rotation angle and/or speed can accumulate. Rotation state corrector 112 can first detect an object in the field of view of the one or more camera devices of machine entity 102 when machine entity 102 is unmoving. The object itself can be a reference object, and a specific position and orientation of the object with respect to the one or more camera devices can be stored. As machine entity 102 continues to move or rotate, rotation state corrector 112 can then determine whether machine entity 102 has returned to an orientation where the reference object is back in the stored specific position or orientation with respect to the camera device. In response to determining that the reference object is in the saved specific position and orientation, rotation state corrector 112 can reset any running sum of the rotation angles determined by rotation state estimator 108 to be zero. In other words, if the rotation angles from multiple intensity plots are summed to determine the overall rotation angle of machine entity 102 over the time range spanned by the multiple intensity plots, rotation state corrector 112 can reset the overall rotation angle when the reference object is detected in the specific position or orientation.

Routine activity detector 114 can detect when machine entity 102 is performing a routine activity. Routine activity detector 114 can first obtain intensity plots over time from intensity data store 110. Routine activity detector 114 can determine variances between the obtained intensity plots over time. After determining the variances, routine activity detector 114 can determine whether an average of the determined variances exceeds a predefined variance threshold. If the average of the variances does not exceed the threshold, then that can mean that the variance is acceptable and that the intensity plots are similar enough to indicate similar rotational motion being repeated across different the intensity plots. This can indicate that machine entity 102 is performing a routine activity with a predictable and regular rotation motion over time. For example, routine activity detector 114 can be repetitively bulldozing, shoveling, dumping, storing, mixing, transporting, lifting, constructing, and/or landscaping. In response to determining that the average of the variances does not exceed the predefined threshold, routine activity detector 114 can provide an indication of the routine activity detected to entities associated with machine entity 102.

Figure 2:
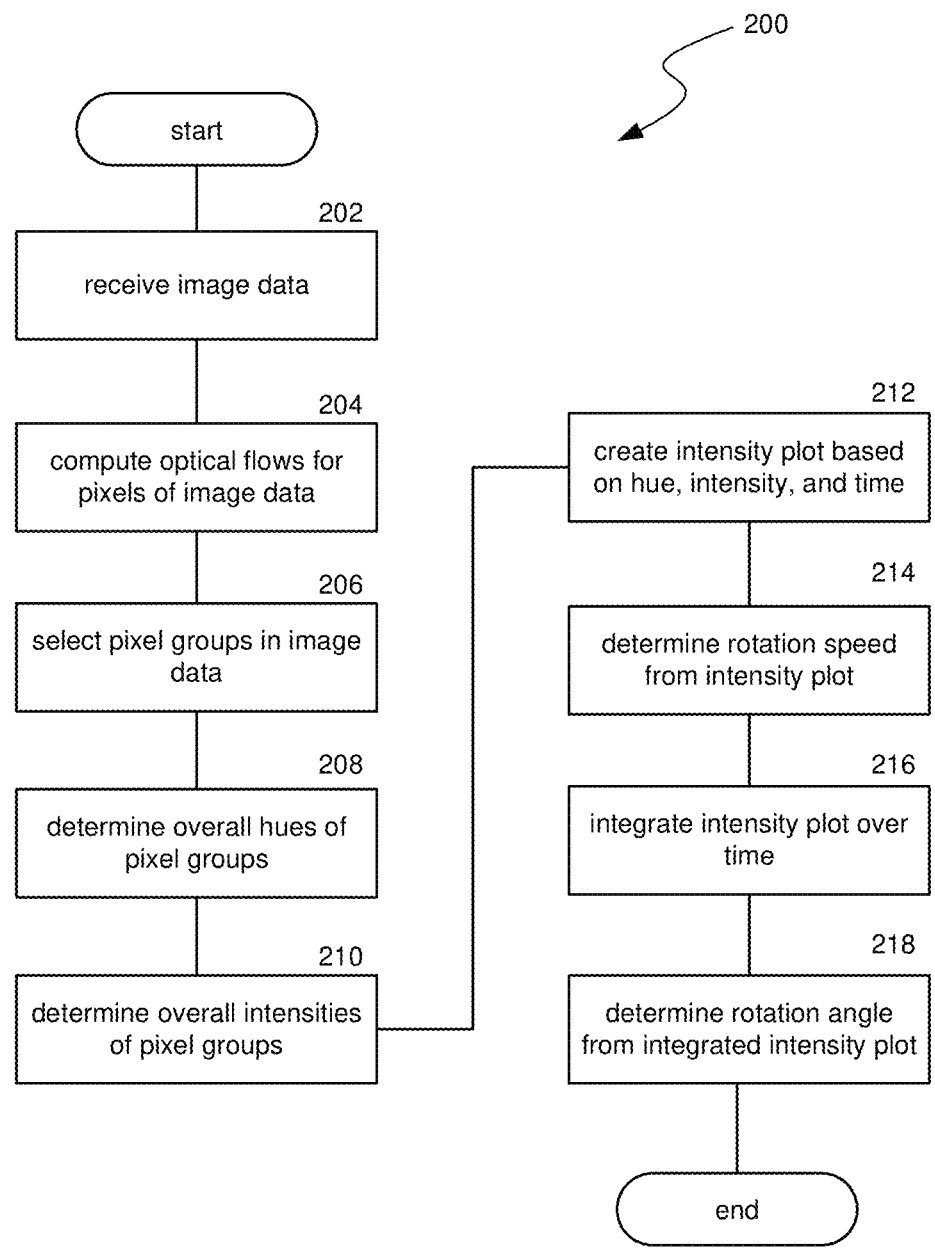
FIG. 2 is a flow diagram illustrating a process used in some implementations for estimating a rotation state of a machine.

FIG. 2 is a flow diagram illustrating a process 200 used in some implementations for estimating a rotation state of a machine. At block 202, process 200 can receive image data records. Process 200 can obtain the image data records from a camera device, of a machine that can rotate. The camera device can consecutively capture the image data records of the environment and surrounding of the machine as it moves and rotates. For example, the image data records can be timestamped consecutively based on the framerate or image capture speed of the camera device. At block 204, process 200 can compute the optical flow vectors for the pixels of each received image data record. Process 200 can compute the optical flow vectors for pixels of each particular image data record of the image data records based on the particular image data record and a previous image data record (one sampled or collected consecutively before). In other words, process 200 can compute optical flow vectors by comparing image data records that are consecutive frames of one another to determine the apparent motion across the frames of the image data records. The optical flow vectors can capture how the machine is moving or rotating with respect to the environment the machine is in. In some implementations, process 200 can compute the optical flow vectors using a dense optical flow method, where an optical flow vector is determined for every pixel of every image data record.

At block 206, process 200 can select pixel groups for the image data records. For each particular image data record of the image data records, process 200 can select a group of pixels all concentrated in a specific region of the image data record (i.e., pixel group). In some implementations, the specific region of the selected pixel group can be near and/or at the bottom center or center of the particular image data record. For example, process 200 can select pixels with image coordinates concentrated near and/or at the bottom center or center of the particular image data record. The bottom center or center pixels can be nearest the center of the lens of the camera device and entities appearing there can be closest to the optical sensor of the camera device. Thus, entities that appear near and/or at the bottom center or center pixels can be the less distorted in the particular image data record and can produce the best visual representation of how the machine is moving with respect to the environment. Furthermore, objects or subjects can be least likely to appear near and/or at the bottom center pixels, thereby allowing process 200 to filter moving objects or subjects unassociated with the rotation and motion of the machine itself. In other implementations, the specific region of the selected pixel group can be near the edges or an arbitrary region away from the center of the particular image data record. Because pixels near the edges or away from the center can be further from the center of the camera device lens and entities appearing there can be further from the optical sensor, the pixels can be the more distorted. Process 200 can account for the distortion by performing a transformation on the optical flow vectors determined for the pixel group (e.g., unwarping pixels at edges based on camera intrinsic and/or extrinsic parameters).

At block 208, process 200 can determine the overall hues of the pixel groups. For each particular image data record of the image data records, process 200 can determine the overall hue of the pixel group selected at block 206 for the particular image data record. Process 200 can determine the hue of the pixel group based on the optical flow vectors determined for the pixels of the pixel group at block 204. Process 200 can first determine the directions of the optical flow vectors of the pixels of the pixel group. If the pixel of the particular image data record has an optical flow vector pointing towards the right, then process 200 can determine a red hue for the pixel. If the pixel of the particular image data record has an optical flow vector pointing towards the left, then process 200 can determine a cyan hue for the pixel. If the pixel of the particular image data record has an optical flow vector pointing in neither of the left and right directions, then process 200 can determine no hue (e.g., pure black) for the pixel. In other words, pixels of the pixel group with optical flow vectors pointing rightwards can map to red hues, pixels of the pixel group with optical flow vectors pointing leftwards can map to cyan hues, and pixels of the pixel group with optical flow vectors pointing in neither direction can map to no hue. After determining the hues of the individual pixels of the pixel group of the particular image data record, process 200 can determine the overall hue of the particular image data record to be the hue that occurs in aggregate most frequently in the pixels of the pixel group (i.e., a majority hue). For example, if there are 10 red hued pixels, 2 cyan hued pixels, and 1 black hued pixel of the pixel group, process 200 can determine the overall hue of the pixel group and particular image data record to be red, the majority hue. In some implementations, process 200 can average all the optical flow vectors of the pixels of the pixel group. Based on the direction of the average optical flow vector of the pixels of the pixel group, process 200 can determine an overall red or cyan hue for the pixel group.

At block 210, process 200 can determine the overall intensities of the pixel groups. For each particular image data record of the image data records, process 200 can determine the overall intensity of the pixel group selected at block 206 for the particular image data record. Process 200 can determine the intensity of the pixel group based on the optical flow vectors determined for the pixels of the pixel group at block 204. Process 200 can first determine the magnitude of the optical flow vectors of the pixels of the pixel group. The pixels with larger magnitude optical flow vectors can be represented with greater intensity values (e.g., more whites, less grays/blacks), while the pixels with smaller magnitude optical flow vectors can be represented with lesser intensity values (e.g., less whites, more grays/blacks). In other words, optical flow vectors with greater magnitude can map or scale to higher intensity values, while optical flow vectors with lesser magnitude can map or scale to lower intensity values. For example, a pixel of the pixel group with an optical flow vector of large magnitude pointing leftwards can be represented by a bright or high intensity cyan hue. As another example, a pixel of the pixel group with an optical flow vector of small magnitude pointing rightwards can be represented by a dark or low intensity red hue. After determining the intensities of the individual pixels of the pixel group of the particular image data record, process 200 can determine the overall intensity for the particular image data record by aggregating the intensities of the individual pixels of the pixel group. Process 200 can aggregate the intensities by computing an average, weighted average, or median of the individual pixels of the pixel group. For example, if a pixel group has pixel intensities of 20, 30, and 40, process 200 can determine the overall intensity to be 30 when averaging the pixel intensities. In some implementations, process 200 can calculate the weighted average by weighting the individual pixels based on how close the image coordinates of the individual pixels are to the center of the pixel group.

Since optical flow vectors can extract motion information from the image data records, the hue and intensity of the particular image data record can represent the direction and speed of rotation of the machine respectively at the timestamp of the particular image data record. In other words, red hues of higher intensity, red hues of lower intensity, cyan hues of higher intensity, and cyan hues of lower intensity can map or scale to counterclockwise rotations of faster speed, counterclockwise rotations of slower speed, clockwise rotations of faster speed, and clockwise rotations of slower speed respectively. Accordingly, when the machine is rotating at an instance quickly with respect to its environment/surrounding, process 200 can determine an overall higher intensity for the particular image data record collected at that instance. When the machine is rotating at an instance slowly with respect to its environment/surrounding, process 200 can determine an overall lower intensity for the particular image data record collected at that instance. The hue can further inform the direction the machine is rotating with respect to the environment/surrounding, or the direction the environment is moving with respect to the rotating machine.

In some implementations, if the optical flow vectors of the pixels are pointing upward in the particular image data record, then process 200 can determine that the machine is moving forwards. if the optical flow vectors of the pixels are pointing downward in the particular image data record, then process 200 can determine that the machine is moving backwards. An optical flow vector with a great magnitude pointing upwards or downwards can be moving forward or backward quickly, respectively. An optical flow vector with a lesser magnitude pointing upwards or downwards can be moving forward or backward slowly, respectively.

At block 212, process 200 can create an intensity plot based on the hue, intensity, and time of the image data records. Each particular image data record of the image data records can have a corresponding timestamp, overall hue, and overall intensity determined at blocks 202, 208, and 210 respectively. For example, the particular image data record can correspond to a datatype of the form {timestamp, intensity, hue}. Process 200 can fit the timestamps and intensities of the image data records to an intensity plot over time, where the Y-values are the intensities, and the X-values are the timestamps. Each point on the intensity over time plot can be a timestamp-intensity pair for a particular image data record (e.g., {timestamp, intensity} pairs fit to the intensity plot over time). As a result, there can be "n" plotted points on the intensity plot over time for "n" different image data records timestamped consecutively. In some implementations, if the hue for the particular image data record is cyan, the corresponding intensity for the particular image data record can be negated when plotted to the intensity plot over time. In other words, negative intensity values of the intensity plot can represent cyan hues and clockwise rotation, while positive intensity values of the intensity plot can represent red hues and counterclockwise rotation.

At block 214, process 200 can determine the rotation speed from the intensity plot over time. The intensity over time plot can represent the rotation speed of the machine over time, where the intensity at a time of the plot gives the rotation speed at that time. The hue corresponding to the intensity or sign of the intensity value gives the rotation direction at that time. In some implementations, process 200 can scale or normalize the intensity value at a time to determine the rotation speed in specific units of measurement or SI units. For example, process 200 can determine the rotation speed by applying a mapping function that maps the intensity values of the intensity plot to proportional rotation speeds in degrees per second.

At block 216, process 200 can integrate the intensity plot over time. In some implementations, process 200 can first fit a curve to the plotted points of the intensity plot over time using a regression-based method (e.g., linear regression, non-linear regression). Process 200 can perform transformations on the variables of the intensity plot points before performing the regression, such as transforming the variables to polynomial variables, reciprocal variables, logarithmic variables, exponential variables, etc. The transformation can help better fit the curve and/or reduce the R-squared value. Process 200 can then integrate the intensity plot over time by calculating the integral of the fitted intensity plot curve. In some implementations, process 200 can calculate the definite integral by computing the area under the fitted intensity plot curve. The definite integral can represent approximately how much the machine entity has rotated, or the rotation angle, in the time range spanned by the points of the intensity plot. In various implementations, process 200 can calculate the indefinite integral by integrating the function of the fitted intensity plot curve. The indefinite integral can represent approximately how much the machine has rotated, or the rotation angle, at an instance in time.

At block 218, process 200 can determine the rotation angle of the machine from the integrated intensity plot over time. The calculated integral can represent how much the machine has rotated, or the rotation angle, in the time spanned by the image data records used to create the intensity plot. In some implementations, process 200 can scale or normalize the calculated integral to determine the rotation angle in specific units of measurement or SI units. For example, process 200 can determine the rotation angle by applying a mapping function that maps the integral of the intensity plot to a proportional rotation angle in degrees.

Figure 3:
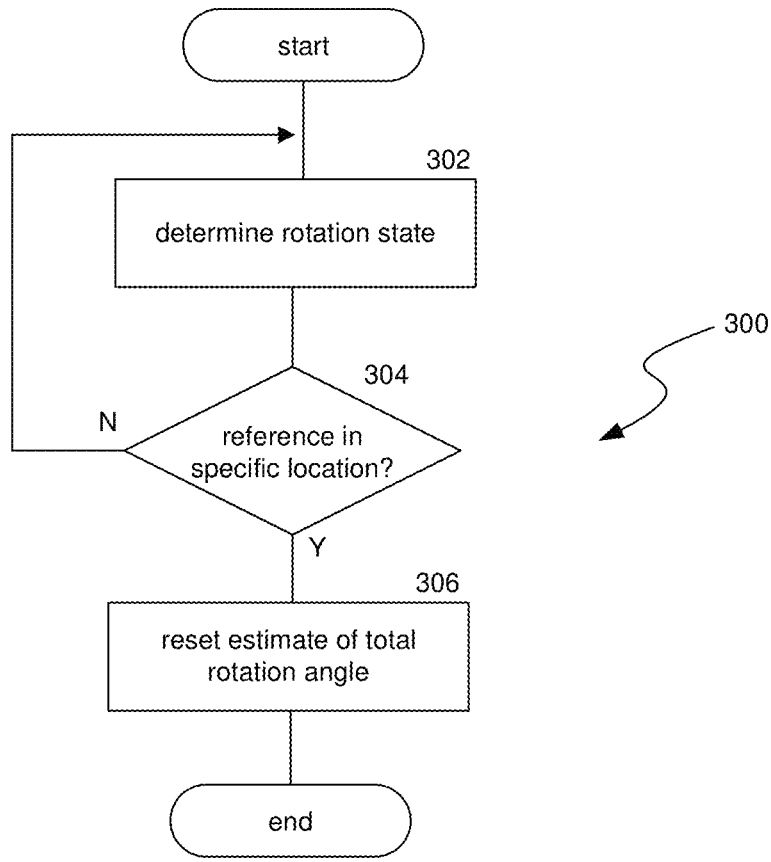
FIG. 3 is a flow diagram illustrating a process used in some implementations for correcting the estimated rotation state of the machine.

FIG. 3 is a flow diagram illustrating a process 300 used in some implementations for correcting the estimated rotation state of the machine. At block 302, process 300 can determine the rotation state of the machine. The rotation state can include the rotation speed and/or rotation angle. In some implementations, process 300 can determine the rotation state by triggering process 200 of FIG. 2 and obtaining the rotation speed and angle determined at blocks 214 and 218 respectively.

At block 304, process 300 can determine whether a reference object is in a specific location with respect to the camera device of the machine. The specific location can be defined as a specific position and/or orientation of the reference object. The reference object can be a non-moving object with respect to the machine (can be part of or not part the machine) that when detected in the specific location indicates that the machine has returned to a reference position. For example, the reference object can be the tracks of an excavator machine that do not contribute to the rotation of the excavator above the swing drive and are un-moving when only the upper-body is rotating. Process 300 can first identify whether the reference object is present in a most recently collected image data record. Process 300 can then detect whether the reference object is in the specific position and/or orientation. In some implementations, process 300 can use an object detection algorithm (e.g., machine learning-based, computer vision-based, template or model matching) trained to determine whether the reference object is present in the specific position and/or orientation. If the reference object is not in the specific location, process 300 can return to block 302 to continue to determine the rotation state of the machine. If the reference object is in the specific location, process 300 can proceed to block 306.

At block 306, process 300 can reset an estimate of the total rotation angle (i.e., total rotation angle). In some implementations, process 300 can reset the total rotation angle by setting the total rotation angle to be zero. Process 300 can reset the total rotation angle in response to determining that the reference object is in the specific location and thus the machine has returned to the reference position. The reference position can be a reset position for the machine to correct for possible accumulation of error when a running sum of the estimated rotation angles is computed. Process 300 can compute the running sum of rotation angles determined at block 302 to estimate the total rotation angle of the machine over a time span. For example, suppose process 300 has determined at iterations of block 302 that the rotation angle between the time ranges 0-1 ms, 1-2 ms, and 2-3 ms, correspond to 10 degrees, 20 degrees, and 30 degrees. Process 300 can determine that the total rotation angle of the machine over the span of the 3 ms is 60 degrees, by summing 10, 20, and 30 degrees. Due to the possible estimation error at each time range that can occur (the estimations are not perfect), the error can grow or accumulate when process 300 sums the rotation angles. Process 300 can reset the estimated total rotation angle back to zero when the reference object is in the specific location. By resetting the estimation, process 300 can prevent further accumulation of error and can restars the running sum to estimate the total rotation angle as the machine rotates away from the reference object.

Figure 4:
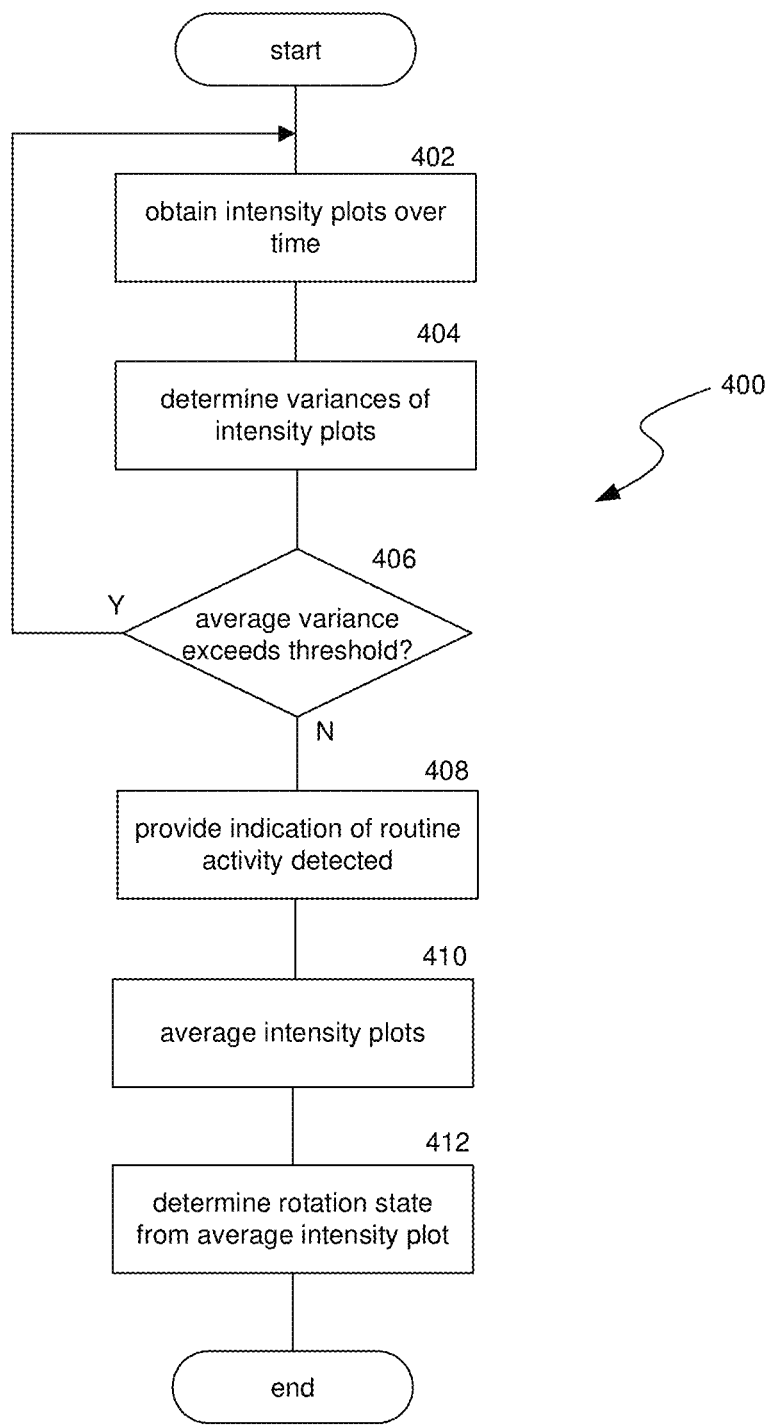
FIG. 4 is a flow diagram illustrating a process used in some implementations for detecting when the machine is performing a routing activity.

FIG. 4 is a flow diagram illustrating a process 400 used in some implementations for detecting when the machine is performing a routine activity. At block 402, process 400 can obtain intensity plots over time. In some implementations, process 400 can obtain the intensity plots over time created at various iterations of block 212 of process 200 in FIG. 2. The obtained intensity plots can be sequential, meaning the time range of each obtained intensity plot can follow the time range of other obtained intensity plots.

At block 404, process 400 can determine the variances of the obtained intensity plots. Process 400 can first sample a predefined number of points from each of the obtained intensity plots. For example, process 400 can sample 5 points from each of intensity plots 1, 2, and 3. Process 400 can then determine the variance of the sampled points across the different intensity plots. Continuing with the previous example, process 400 can determine the variance of the first, second, third, fourth, and fifth sampled points across the intensity plots 1, 2, and 3. Process 400 can calculate 5 different variances in this example, where each variance measures the spread across the 3 different plots for a particular sampled point of the 5 sampled points.

At block 406, process 400 can determine whether the average of the determined variances exceed a predefined variance threshold. Process 400 can average the variances determined at block 404. Continuing with the previous example, process 400 can average the 5 different variances calculated to determine an average variance. If the average variance does not exceed the predefined variance threshold, process 400 can return to block 402 to continue to obtain new intensity plots over time. If the average variance does exceed the predefined variance threshold, process 400 can proceed to block 408.

At block 408, process 400 can provide an indication of routine activity detected. Process 400 can detect that the machine is performing a routine activity in response to determining that the variances of the intensity plots are within the predefined threshold. In other words, the close variance between the intensity plots collected over time can indicate that the machine is replicating a rotational motion over time, resulting in a similar curve or waveform across the intensity plots. The replicating rotational motion can signal that the machine is repeating a task, or in other words, performing a routine activity. For example, a series of rotation states repeated over time can indicate that the machine is performing a specific industrial task over and over again. Process 400 can provide an indication of the routing activity being performed by the machine to entities associated with the machine. For example, the associated entities can be operator entities, industrial worksite management entities, activity monitoring entities, maintenance entities, and/or any combination thereof. The associated entities can leverage knowing that the machine is performing the routing activity to carry out subsequent responses or actions.

At block 410, process 400 can average the obtained intensity plots over time. Process 400 can first sample a predefined number of points from each of the obtained intensity plots. For example, process 400 can sample 5 points from each of intensity plots 1, 2, and 3. Process 400 can then determine the average intensities of the sampled points across the different intensity plots. Continuing with the previous example, process 400 can determine the average intensity of the first, second, third, fourth, fifth sampled points across intensity plots 1, 2, and 3. Process 400 can calculate 5 different average intensities in this example, where each measures the average intensity across the 3 different plots for a particular sampled point of the 5 sampled points. The determined average intensities can be plotted to create an average intensity plot. The average intensity plot can represent on average what the rotation angle is at each timestamp in the time range of the obtained intensity plots in block 402. The average intensity plot can, in some instances, correct for possible errors, outliers, or noise in the obtained intensity plots. The average intensity plot can be a more accurate estimation of the rotation angle over time than the individual obtained intensity plots if the activity performed, while the machine is rotating, is repetitive in nature. At block 412, process 400 can determine the rotation state of the machine from the average intensity plot over time. In some implementations, process 400 can determine the rotation state by triggering blocks 214, 216, and 218 of process 200 in FIG. 2 and obtaining the rotation speed and angle from blocks 214 and 218 respectively.

Figure 5:
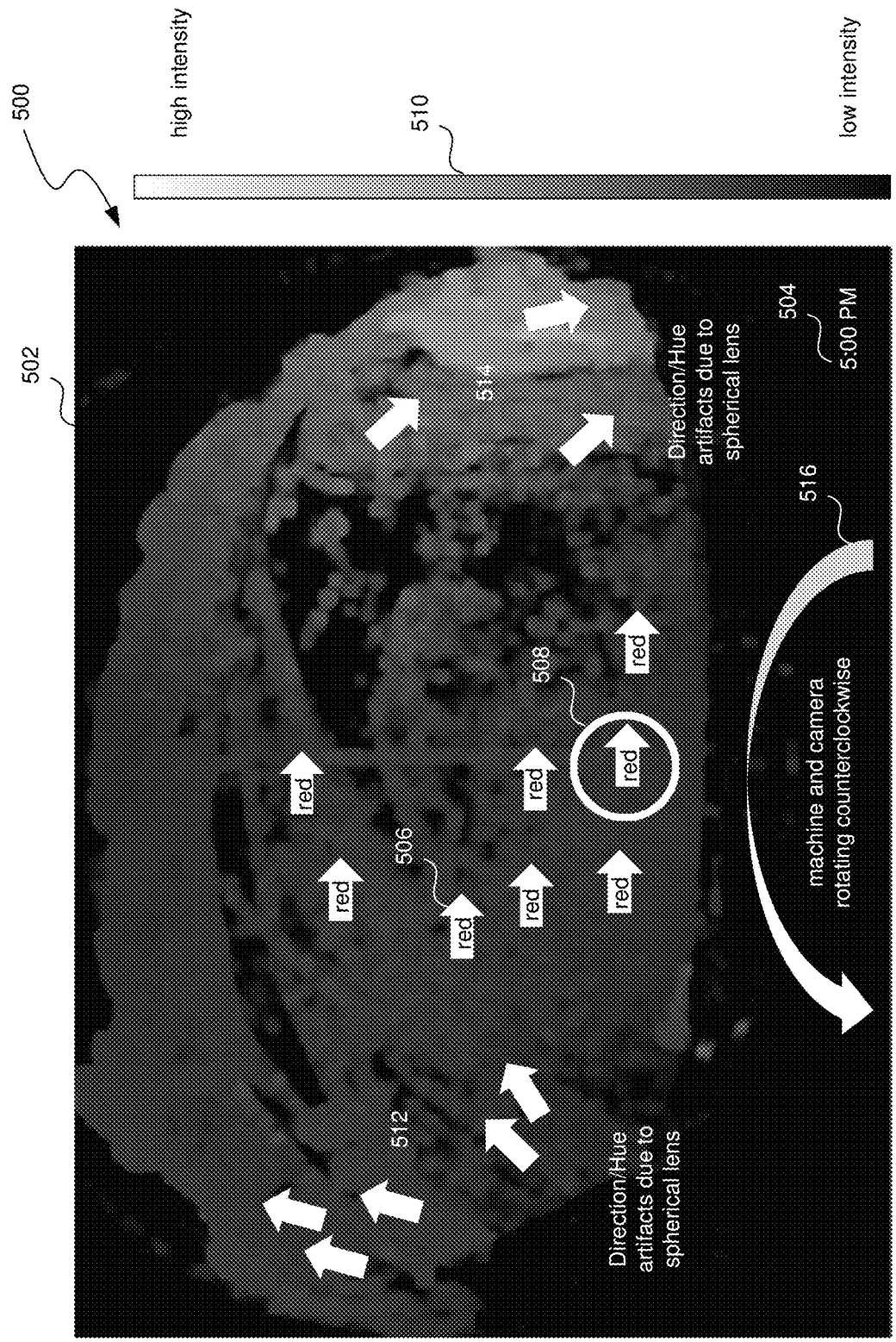
FIG. 5 is a conceptual diagram illustrating an example of determining optical flow vectors, hues, and intensities from image data.

FIG. 5 is a conceptual diagram illustrating an example 500 of determining optical flow vectors 506, hues, and intensities from image data 502. Example 500 can include an image data record 502, or more specifically a frame, received at an instance from the camera device of a rotating machine. At timestamp 504 when image data record 502 is captured by the camera device, the machine with the camera device can be rotating counterclockwise 516 with respect to objects in the environment and scene of image data record 502. The estimating machine rotation state system can compute optical flow vectors 506 for every pixel of the image data record. Only some of the optical flow vectors 506 are shown visually as arrows in example 500. Optical flow vectors 506 shown in example 500 can be pointed in the rightwards direction since objects in the environment and scene of image data record 502 are moving left-to-right with respect to the machine and camera device.

The estimating machine rotation state system can determine the hue of the pixels to be red when optical flow vectors 506 are pointing rightwards and cyan when optical flow vectors 506 are pointing leftwards. In addition to pointing left or right, optical flow vectors 506 can also be pointing upwards or downwards. This can especially be the case for optical flow vectors 506 near edges 512 and 514 of image data record 502 when the machine is rotating. In some implementations, the estimating machine rotation state system can still determine the optical flow vectors 506 at edges 512 and 514 to be either red hue or cyan hue depending on whether the x-components of optical flow vectors 506 are pointing mostly rightwards or leftwards respectively. In other implementations, the estimating machine rotation state system can determine the hues of the pixels from where the corresponding optical flow vectors 506 lie on a hue spectrum (e.g., pure red hues mapping to optical flow vectors only pointing to the right and pure cyan hues mapping to optical flow vectors only pointing to the left). For example, optical flow vectors 506 on the left edge 512 of image data record 502 can have purple hues, while optical flow vectors 506 on the right edge 514 of image data record 502 can have green hues.

The estimating machine rotation state system can determine the intensity of the pixels to be high when the magnitude of optical flow vectors 506 is large and low when the magnitude of optical flow vectors 506 is small, as shown in key 510. Accordingly, some pixel regions of image data record 502 can appear darker than others (i.e., the blacker pixels), while some pixel regions can appear brighter than others (i.e., the whiter pixels). The estimating machine rotation state system can select pixel group 508 near the bottom center of image data record 502 for creating an intensity plot over time. In some implementations, the estimating machine rotation state system can select pixel group 508 from any region in image data record 502 that contains pixels of relatively similar intensities and hues.

Figure 6:
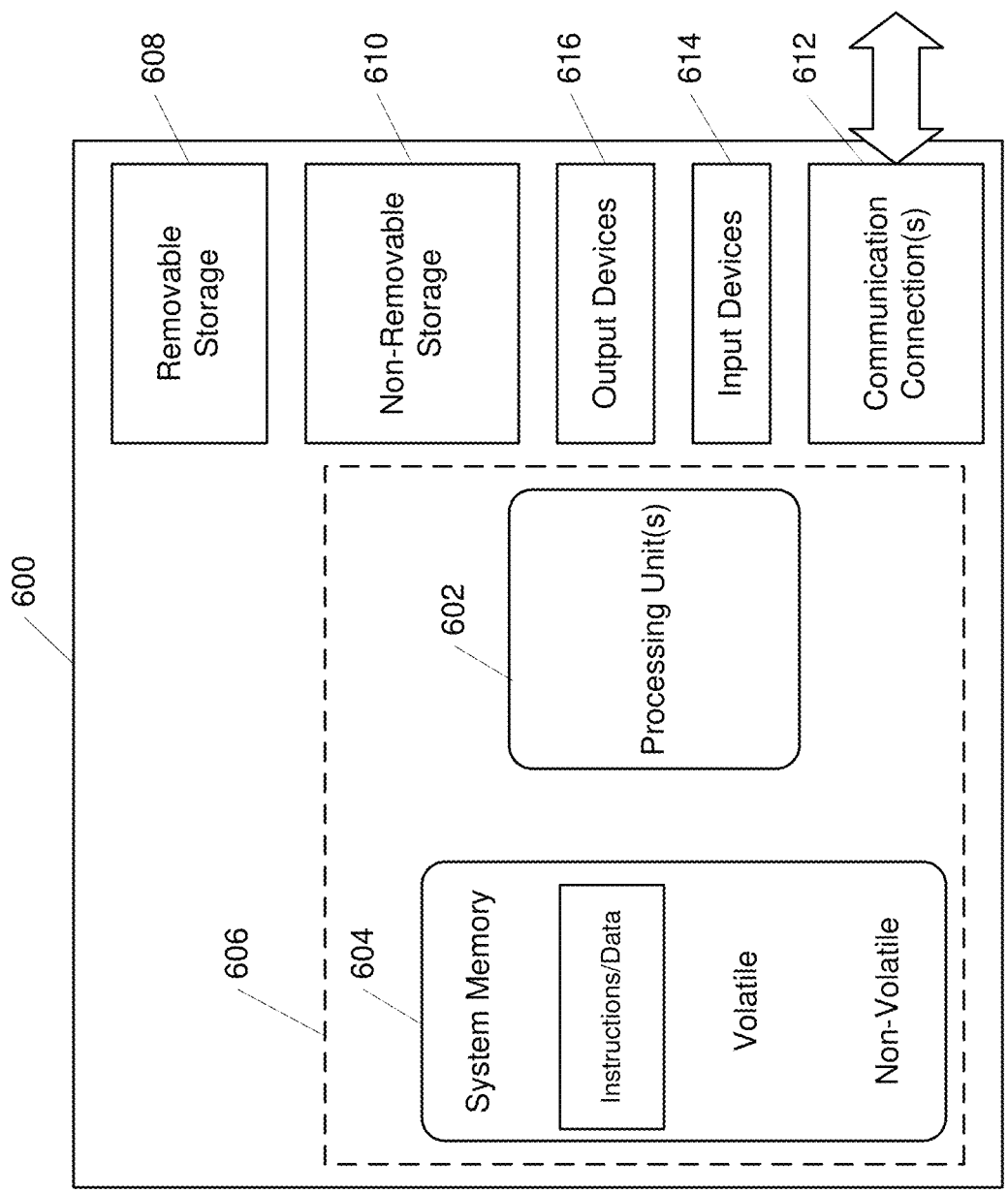
FIG. 6 illustrates one example of a suitable operating environment in which one or more of the present embodiments may be implemented.

FIG. 6 is a flow diagram illustrating an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

INDUSTRIAL APPLICABILITY

Aspects of the present disclosure are directed to an estimating machine rotation state system that can be used for machines in industrial settings. The estimating machine rotation state system can estimate the rotation speed and/or angle of a rotatable machine (i.e., the rotation state) via camera and vision-based methods. Information regarding the rotation state of a machine can better inform machine operators, observers, and/or maintenance of activities being performed by the machine and use the rotational information to supplement other systems. For example, knowing how much an excavator or crane machine has rotated can allow operators to better position the excavator or crane machine in relation to target objects (e.g., dirt, construction materials, infrastructure components, minerals, natural resources).

By using just camera devices, the estimating machine rotation state system can perform robust estimation of the rotation state of a machine without complex sensors, sensory processing, or knowledge of the kinematics and/or dynamics of the machine. In industrial settings, in which the kinematics and/or dynamics can differ drastically from machine to machine, being able to estimate rotational motion from just camera data can significantly reduce costs and time needed to understand the parameters of the machine. Camera devices have become readily available, low in cost, and reliably precise. Complex sensors that are prone to error, easily damageable, and/or not always readily available in industrial settings can make the camera and vision-based methods of rotation state estimation as described herein even more appealable.

In some instances, the estimating machine rotation state system can also correct for errors in the rotation state estimation. By resetting the estimated total rotation angle when reference objects are detected, the estimating machine rotation state system can correct for error accumulation in camera data and estimation over time. Such error correction can be beneficial in industrial settings where even minor errors can be detrimental to an activity being performed and can damage the surrounding environment of the machine. For example, if the error in estimated rotation speed builds up over time, the rotation speed of a crane machine can become unpredictable and, in some instances, overshoot to damage materials being transported on the crane or collide with the destination locations of the materials. The estimating machine rotation state system can mitigate and/or prevent such problems.

In further instances, the estimating machine rotation state system can detect that a machine is performing a routine activity. Routine activity detection can be a useful industrial application for worksite observers that would like to identify that a machine is undergoing regular operations. For example, the estimating machine rotation state system can determine that a crane machine is repeating a series of rotation states over time and is likely performing a repeated or routine activity involving movement to said series of rotation states over time. With automated routine activity detection capabilities, the estimating machine rotation state system can be integrated in industrial settings that can benefit largely from autonomous activity monitoring. Accordingly, the estimating machine rotation state system can reduce the costs and time of observers and monitoring systems.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system comprising:
   one or more processors, and
   one or more memories storing instructions that, when executed by the one or more processors, cause the system to perform a process for estimating machine rotation state, the process comprising:
   receiving one or more image data records from a camera device of a machine entity, wherein the one or more image data records are timestamped consecutively;
   for each particular image data record of the one or more image data records:
   generating one or more optical flow vectors for a set of pixels of the particular image data record;
   selecting a subset of pixels from the set of pixels of the particular image data record; and
   determining a hue and intensity of the subset of pixels, corresponding to the particular image data record, based on the one or more optical flow vectors for the subset of pixels;
   generating an intensity plot over time based on the determined hues, intensities, and timestamps of the one or more image data records;
   calculating an integral of the generated intensity plot over time; and
   determining a rotation angle of the machine entity based on the calculated integral of the intensity plot over time.

2. The system of claim 1, the process further comprising: determining a rotation speed of the machine entity based on the generated intensity plot over time.

3. The system of claim 1, the process further comprising:
   determining whether a reference object in is in a specific position or orientation with respect to the camera device; and
   in response to determining that the reference object is in the specific position or orientation with respect to the camera device, resetting the determined rotation angle.

4. The system of claim 1, the process further comprising:
   obtaining a second intensity plot that is generated after a first intensity plot, wherein the first intensity plot is the intensity plot over time;
   determining one or more variances between the second intensity plot and the first intensity plot;
   determining whether an average of the one or more variances exceeds a predefined variance threshold; and
   in response to determining that the average of the one or more variances exceeds the predefined variance threshold, providing an indication of a routine activity detected to one or more entities associated with the machine entity.

5. The system of claim 4, the process further comprising:
   determining an average intensity plot over time by averaging the first intensity plot and the second intensity plot;
   calculating an integral of the average intensity plot over time; and
   determining a rotation angle of the machine entity based on the calculated integral of the average intensity plot over time.

6. The system of claim 4, wherein the routine activity is selected from the group consisting of: bulldozing, shoveling, dumping, storing, mixing, transporting, lifting, constructing, and landscaping.

7. The system of claim 4, wherein at least one of the one or more entities associated with the machine entity is selected from the group consisting of: operator entities, industrial worksite management entities, activity monitoring entities, and maintenance entities.

8. The system of claim 1, wherein at least one of the one or more image data records is selected from the group consisting of: digital camera images, panoramic images, videos, video frames, smart camera images; wide-angle lens camera images, and fisheye lens camera images.

9. The system of claim 1,
   wherein the hue is a red hue or cyan hue;
   wherein the red hue represents counterclockwise rotation of the machine entity; and
   wherein the cyan hue represents clockwise rotation of the machine entity.

10. The system of claim 1, wherein the intensity represents a rotation speed of the machine entity.

11. A computer-implemented method for estimating machine rotation state, the method comprising:
    receiving one or more image data records from a camera device of a machine entity, wherein the one or more image data records are timestamped consecutively;
    for each particular image data record of the one or more image data records:
    generating one or more optical flow vectors for a set of pixels of the particular image data record;

selecting a subset of pixels from the set of pixels of the particular image data record; and determining a hue and intensity of the subset of pixels, corresponding to the particular image data record, based on the one or more optical flow vectors for the subset of pixels;

generating an intensity plot over time based on the determined hues, intensities, and timestamps of the one or more image data records;

calculating an integral of the generated intensity plot over time; and determining a rotation angle of the machine entity based on the calculated integral of the intensity plot over time.

12. The method of claim 11, wherein the subset of pixels has image coordinates near a bottom center of each of the one or more image data records.

13. The method of claim 11, wherein the determining the rotation angle of the machine entity comprises: scaling or normalizing the calculated integral over time to determine the rotation angle of the machine entity.

14. The method of claim 11, wherein the machine entity is an excavator, cement truck, bulldozer, truck, asphalt paver, backhoe loader, cold planer, compactor, dozer, dragline, drill, rope shovel, mining shovel, material handler, motor grader, pipelayer, road reclaimer, track loader, telehandler, track loader, mining truck, conveyer, utility vehicle, wheel loader, tractor, or scraper.

15. The method of claim 11, wherein the timestamps of the one or more image data records are a predefined amount of time apart from one another, based on a framerate of the camera device, and are within a time range.

16. A non-transitory computer-readable storage medium storing non-transitory computer executable instructions that, when executed by a computing system, cause the computing system to perform a process for estimating machine rotation state, the process comprising:

receiving one or more image data records from a camera device of a machine entity, wherein the one or more image data records are timestamped consecutively;

for each particular image data record of the one or more image data records:

generating one or more optical flow vectors for a set of pixels of the particular image data record;

selecting a subset of pixels from the set of pixels of the particular image data record; and determining a hue and intensity of the subset of pixels, corresponding to the particular image data record, based on the one or more optical flow vectors for the subset of pixels;

generating an intensity plot over time based on the determined hues, intensities, and timestamps of the one or more image data records;

calculating an integral of the generated intensity plot over time; and determining a rotation angle of the machine entity based on the calculated integral of the intensity plot over time.

17. The non-transitory computer-readable storage medium of claim 16, the process further comprising:

determining whether a reference object in is in a specific position or orientation with respect to the camera device; and in response to determining that the reference object is in the specific position or orientation with respect to the camera device, resetting the determined rotation angle.

18. The non-transitory computer-readable storage medium of claim 17, wherein determining the reference object is in the specific position or orientation with respect to the camera device comprises: identifying the reference object using an object detection algorithm.

19. The non-transitory computer-readable storage medium of claim 16, the process further comprising:

obtaining a second intensity plot that is generated after a first intensity plot, wherein the first intensity plot is the intensity plot over time;

determining one or more variances between the second intensity plot and the first intensity plot;

determining whether an average of the one or more variances exceeds a predefined variance threshold; and in response to determining that the average of the one or more variances exceeds the predefined variance threshold, providing an indication of a routine activity detected to one or more entities associated with the machine entity.

20. The non-transitory computer-readable storage medium of claim 19, the process further comprising:

determining an average intensity plot over time by averaging the first intensity plot and the second intensity plot;

calculating an integral of the average intensity plot over time; and determining a rotation angle of the machine entity based on the calculated integral of the average intensity plot over time.

* * * * *